(12) United States Patent
Bhandari

(10) Patent No.: US 8,082,233 B2
(45) Date of Patent: Dec. 20, 2011

(54) COMPARING DATA SETS THROUGH IDENTIFICATION OF MATCHING BLOCKS

(75) Inventor: Vaibhav Bhandari, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1243 days.

(21) Appl. No.: 11/739,671

(22) Filed: Apr. 24, 2007

(65) Prior Publication Data

US 2008/0244355 A1    Oct. 2, 2008

Related U.S. Application Data

(63) Continuation-in-part of application No. 11/693,407, filed on Mar. 29, 2007, now abandoned.

(51) Int. Cl.
*G06F 17/30* (2006.01)
(52) U.S. Cl. ...................................................... 707/687
(58) Field of Classification Search .............. 707/3, 100, 707/687; 714/38
See application file for complete search history.

(56) References Cited

U.S. PATENT DOCUMENTS

| | | | | |
|---|---|---|---|---|
| 5,335,342 | A | * | 8/1994 | Pope et al. .................. 714/38 |
| 6,279,007 | B1 | * | 8/2001 | Uppala ............................. 1/1 |
| 2003/0195869 | A1 | * | 10/2003 | Bhattacharjee et al. ......... 707/3 |
| 2005/0171965 | A1 | * | 8/2005 | Fujimoto et al. ............. 707/100 |
| 2005/0278360 | A1 | * | 12/2005 | Boyd et al. .................. 707/100 |
| 2006/0112264 | A1 | | 5/2006 | Agarwal ....................... 713/150 |

OTHER PUBLICATIONS

Aho, A.V., et al.; "*Bounds on the Complexity of the Longest Common Subsequence Problem*"; Journal of the Association for Computing Machinery, vol. 23, No. 1, Jan. 1976, pp. 1-12.

Bunke, H., et al.; "*Edit distance of run-length coded strings*"; Proceedings of the 1992 ACM/SIGAPP Symposium on Applied Computing: technological challenges of the 1990's, pp. 137-143, Apr. 1992.

* cited by examiner

*Primary Examiner* — Etienne Leroux
(74) *Attorney, Agent, or Firm* — Merchant & Gould

(57) ABSTRACT

A computer-implemented method includes receiving a source data set and a target data set. Differences between the target data set and the source data set are identified by dividing the target data set into a set of target data blocks. At least one duplicate block that is identical to a first portion of the source data set is identified among the target data blocks. At least one modified block for which contents of the modified block are not duplicated within the source data set is identified among the target data blocks. Different portions and identical portions between the modified block and the source data set are also identified.

20 Claims, 12 Drawing Sheets

COMPARING DATA SETS THROUGH IDENTIFICATION OF MATCHING BLOCKS

RELATED APPLICATION—PRIORITY CLAIM

This application is a continuation-in-part of U.S. application Ser. No. 11/693,407 filed on Mar. 29, 2007. This application claims the benefit of the disclosure made in that application and its filing date under 35 U.S.C. §120.

BACKGROUND

Comparing complex sets of data, such as lengthy documents, genetic sequences, or versions of software programs, may be a very computationally-intensive and time-consuming task. The task becomes more difficult when one wishes to quickly and compactly represent the differences between the two data sets.

For example, if the data sets are two versions of a software program, one might wish to generate a difference set that represents the differences between a previous version and a later version. The difference set can then be delivered to a system to update the previous version by applying the changes manifest in the difference set, thereby saving having to transmit the entire later version to the user. Particularly when the user's system has limited storage or memory capacities, or where the user's system may receive updates over a wireless network or other network where bandwidth may be at a premium, being able to update the software by transmitting a difference set instead of transmitting the entire later version may be beneficial.

Unfortunately, generating a compact difference set may be a time-intensive process. Conventional methods of generating a difference set may take hours, days, or even a longer period of time depending on the computing resources available to generate the difference set and the size of the data sets.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is directed to methods and systems for efficiently identifying differences between data sets. Generally, source and target data sets are received. The target data set is divided into blocks. To compare the two data sets, the target data blocks for which an exact copy of their content is located within the source data set are first identified. The differences between the remaining target data blocks and the source data set are then identified by executing a longest subsequence matching process. By first identifying the target blocks that are fully duplicated in the source data set, the execution of a longest subsequence matching process on those blocks is avoided and computation time is thereby reduced. In some implementations a difference set that indicates the identified differences and similarities between the target data set and the source data set is also created.

An implementation of a computer-implemented method includes receiving a source data set and a target data set. Differences between the target data set and the source data set are identified by dividing the target data set into a set of target data blocks. At least one duplicate block that is identical to a first portion of the source data set is identified among the target data blocks. At least one modified block for which contents of the modified block are not duplicated within the source data set is identified among the target data blocks. Different portions and identical portions between the modified block and the source data set are also identified.

An implementation of a computer readable storage medium stores instructions to receive a source data set and a target data set. Instructions are also stored that divide the target data set into a set of target data blocks. Among the target data blocks duplicate blocks in which unbroken copies of the duplicate blocks are located within the source data set are identified. Among the target data blocks non-duplicate blocks in which unbroken copies of the non-duplicate blocks are not located within the source data set are identified. Among the non-duplicate blocks duplicate portions in which unbroken copies of the duplicate portions are located within the source data set are identified.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements. In addition, the first digit in the reference numerals refers to the figure in which the referenced element first appears.

DETAILED DESCRIPTION OF IMPLEMENTATIONS

This detailed description describes implementations of a system for identifying differences and similarities between a source data set and a target data set, and for creating a corresponding difference set. Generally, source and target data sets are received. The target data set is divided into blocks. To compare the two data sets, the target data blocks for which an exact copy of their content is located within the source data set are first identified. The differences between the remaining target data blocks and the source data set are then identified by executing a longest subsequence matching process. By first identifying the target blocks that are fully duplicated in the source data set, the execution of a longest subsequence matching process on those blocks is avoided and computation time is thereby reduced. In some implementations a difference set that indicates the identified differences and similarities between the target data set and the source data set is also created.

Illustrative Operating Environment

Implementations of identifying differences between source data set and a target data set, and the creation of a difference set may be supported by a number of electronic or computerized devices to generate the database query, either locally or over a network. Similarly, implementations for creating a target data set from a source data set and a difference set may also be supported by a number of electronic or computerized devices to generate the database query, either locally or over a network.

Figure 1:
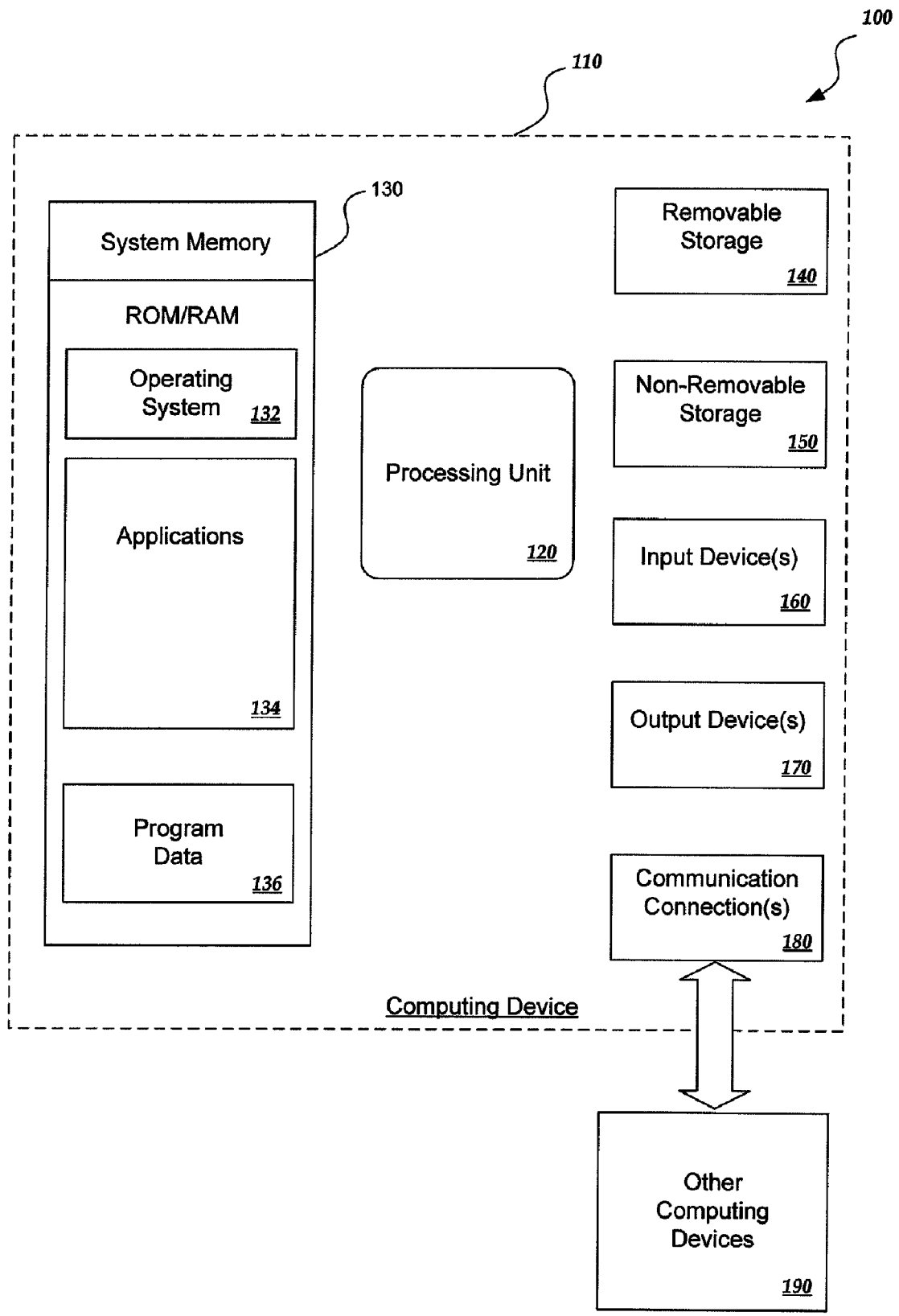
FIG. 1 is a block diagram of an operating environment for implementations of computer-implemented methods as herein described.

FIG. 1 is a block diagram of a representative operating environment 100. In a basic configuration, the computing device 110 may include a stationary computing device or a mobile computing device. The computing device 110 typically includes at least one processing unit 120 and system memory 130. Depending on the exact configuration and type of computing device, the system memory 130 may be volatile (such as RAM), non-volatile (such as ROM, flash memory, and the like) or some combination of the two. The system memory 130 typically includes an operating system 132, one or more applications 134, and may include program data 136.

The computing device 110 may also have additional features or functionality. For example, the computing device 110 may also include additional data storage devices (removable and/or non-removable). Implementations of the computing device 110 that are stationary computing devices may include, for example, magnetic disks, optical disks, or tape, while implementations of the computing device 110 that are mobile computing devices may include, for example, compact flash cards. Such additional storage is illustrated in FIG. 1 by removable storage 140 and non-removable storage 150. Computer storage media may include volatile and non-volatile, removable and non-removable media implemented in any method or technology for storage of information, such as computer readable instructions, data structures, program modules or other data. The system memory 130, the removable storage 140 and the non-removable storage 150 are all examples of computer storage media. Computer storage media includes, but is not limited to, RAM, ROM, EEPROM, flash memory or other memory technology or medium which can be used to store the desired information and which can be accessed by the computing device 110. Any such computer storage media may be part of the device 110. The computing device 110 may also have input device(s) 160. Implementations of the computing device 110 that are stationary computing devices may included, for example, a keyboard, mouse, pen, voice input device, touch input device, etc., while implementations of the computing device 110 that are mobile computing devices may included, for example, voice input device, touch input device, etc. Output device(s) 170 such as a display, speakers, etc. may also be included.

The computing device 110 also contains communication connection(s) 180 that allow the device to communicate with other computing devices 190, such as over a network or a wireless network. The communication connection(s) 180 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared, magnetic and other wireless media. The term computer readable media as used herein includes both storage media and communication media.

Creation of Difference Set Using Page Copy Instructions

Figure 2A:
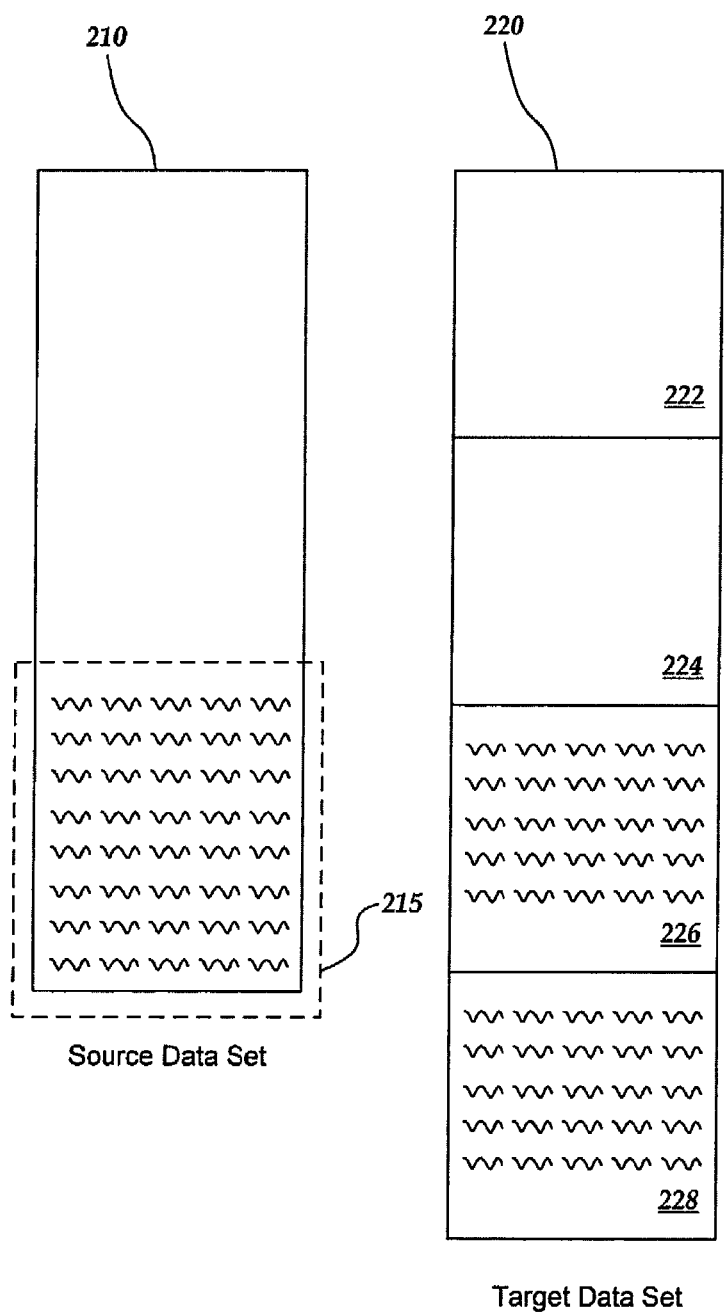
FIGS. 2A-2E are diagrams illustrating an implementation of the creation of a difference set.

FIGS. 2A-2E illustrate an implementation of analyzing a source data set 210 in comparison with a target data set 220 to generate a difference set 270. FIG. 2A shows a source data set 210 and a target data set 220. The source data set 210 includes a large amount of data that is repeated throughout the source data set 210. For example, a source data portion 215 may include many repetitions of the string "0111" as a placeholder. In the example of FIG. 2A, the target data set 220 is a relatively small data set that is divided into four blocks: target block 222, target block 224, target block 226 and target block 228. It will be understood that a large data set will be divided into potentially many thousands of blocks. An unbroken copy of the complete target block 222 is not included within the source data set 210. The target block 222 does contain some subsections of information that are included in the source data set 210 and some subsections of information that are not included within the source data set 210. The target block 224 also contains some subsections of information that are included in the source data set 210 and some subsections of information that are not included in the source data set 210. The target blocks 226 and 228 contain many repetitions of the string "0111," and match information included within the source data portion 215.

Where large portions of repeated data, such as many repetitions of the string "0111," are present in both sets of data, executing a longest subsequence matching process, using any such process understood by those skilled in the art, may be computationally intensive. In general, when large portions of repeated data are present in the target data, the source data often includes similar portions of repeated data. Because the portions of repeated data are often very large, rather than executing a costly longest subsequence matching process, it is advantageous to first check for matching blocks. By identifying whether a block of target data is identically found in the source data, much of the repeated data may be located without the need to execute a longest subsequence matching process. This may dramatically reduce the amount of computation required when handling repeated data.

To create a difference set that includes instructions to build a target data set copy from a source data set, two instructions types are used: copy instructions and data instructions. A copy instruction is a command to copy a portion of the source data to the target data set copy. Copy instructions may be used where there is a portion of information common between both data sets. A data instruction is a command to insert a portion of data, which was not contained in the source data set, into the target data set copy. Data instructions may be used where the target data set contains data not found within the source data set.

Many possible combinations of copy instructions and/or data instructions may be used in the difference set to describe the building of a target data set copy. For example, one possible difference set includes a single data instruction. A complete target data set copy may be created by a single data instruction that includes a command to insert a large string of data associated with the entire target data set. This single data instruction would, however, be no smaller than the original target data set itself. Another possible difference set includes many single-bit copy and/or data instructions. A complete target data set copy may also be created by many single-bit instructions corresponding to each bit of the target data set. Again, this difference set would be no smaller than the target data set itself.

On the other hand, a very small difference set may be created when the source data set is identical to the target data set. In this situation, the difference set may include a single copy instruction. Unlike the single data instruction that includes the full description of the target data set, a single copy instruction may simply include a reference to the location from where the material should be copied and the length of the string that should be copied. This difference set may therefore be small and thus efficiently transmitted from one computer to another, as described below in relation to FIG. 8.

In general, however, a target data set may contain some data that is common to the source data and some data that is unique to the target data set. In this case, to create a difference data set that contains the least amount of information possible, the longest data strings that both sets have in common are located. This may be accomplished by a longest subsequence matching process, as described below.

Figure 2B:
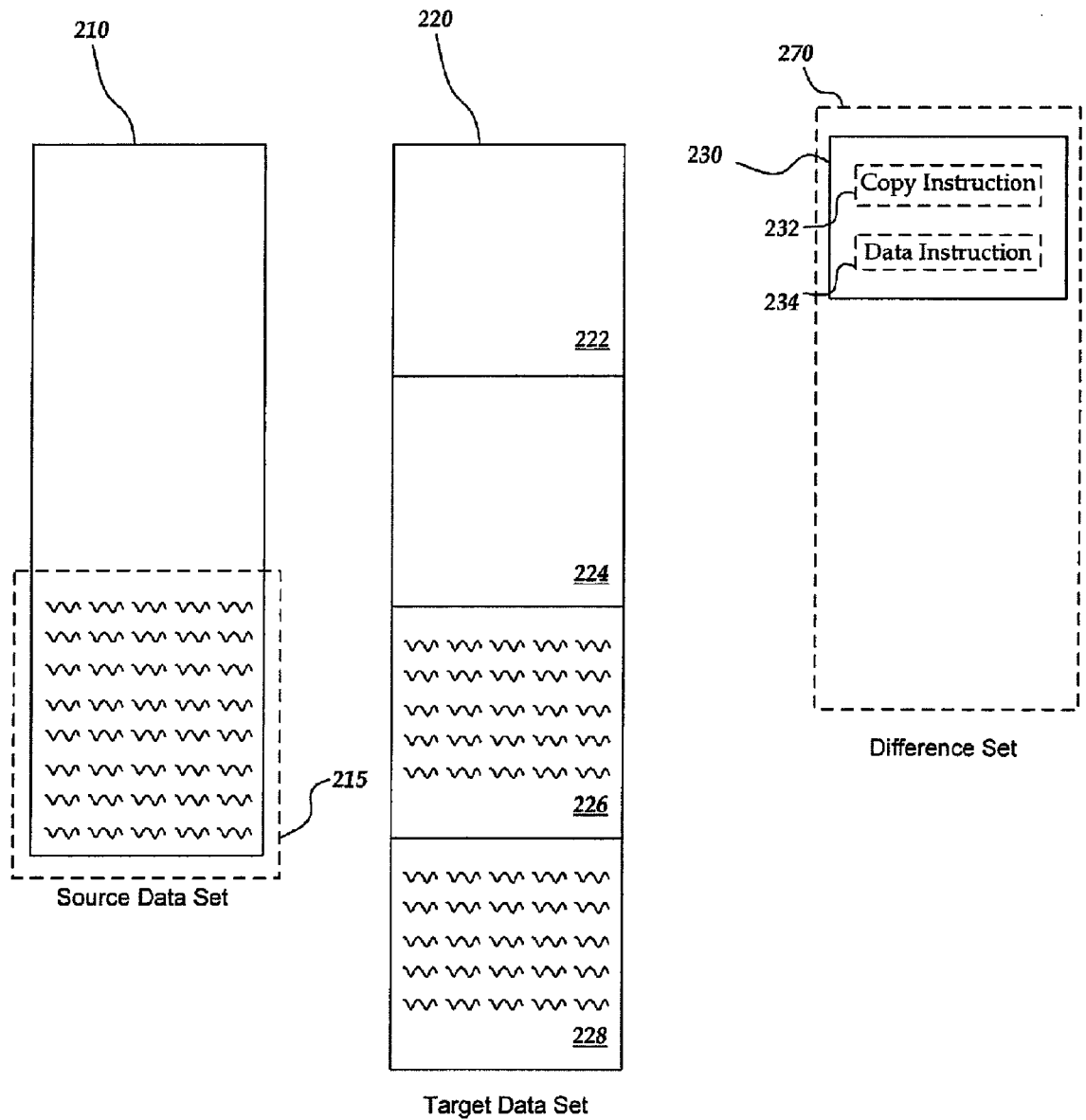

FIG. 2B shows the creation of a first difference portion 230 of a difference set 270 including instructions for copying, when possible, data from the source data set 210. The creation of the first difference portion 230 of the difference set 270 begins with the execution of a page comparison of the first target block 222 to the whole source data set 210. In this case, such a comparison would reveal that an unbroken copy of the complete target block 222 is not included within the source data set 210. The target data block 222 is therefore a non-matching target block and a longest subsequence matching process is executed against the whole source data set 210, as further described below. In response to this process the first difference portion 230 of the difference set 270 is created. The first difference portion 230 of the difference set 270 includes one or more copy instructions 232 to copy a string from the source data set 210 to a copy of the target data set 220 where data is common to both the source data set 210 and the target block 222. The difference portion 230 also includes data instructions 234 to add data not present in the source data set 210 to the copy of the target data set 220. Thus, the first difference portion 230 may provide instructions for the creation of a copy of the target block 222 by copying one or more strings from the source data set 210 and to add one or more new data strings not included in the source data set 210.

Figure 2C:
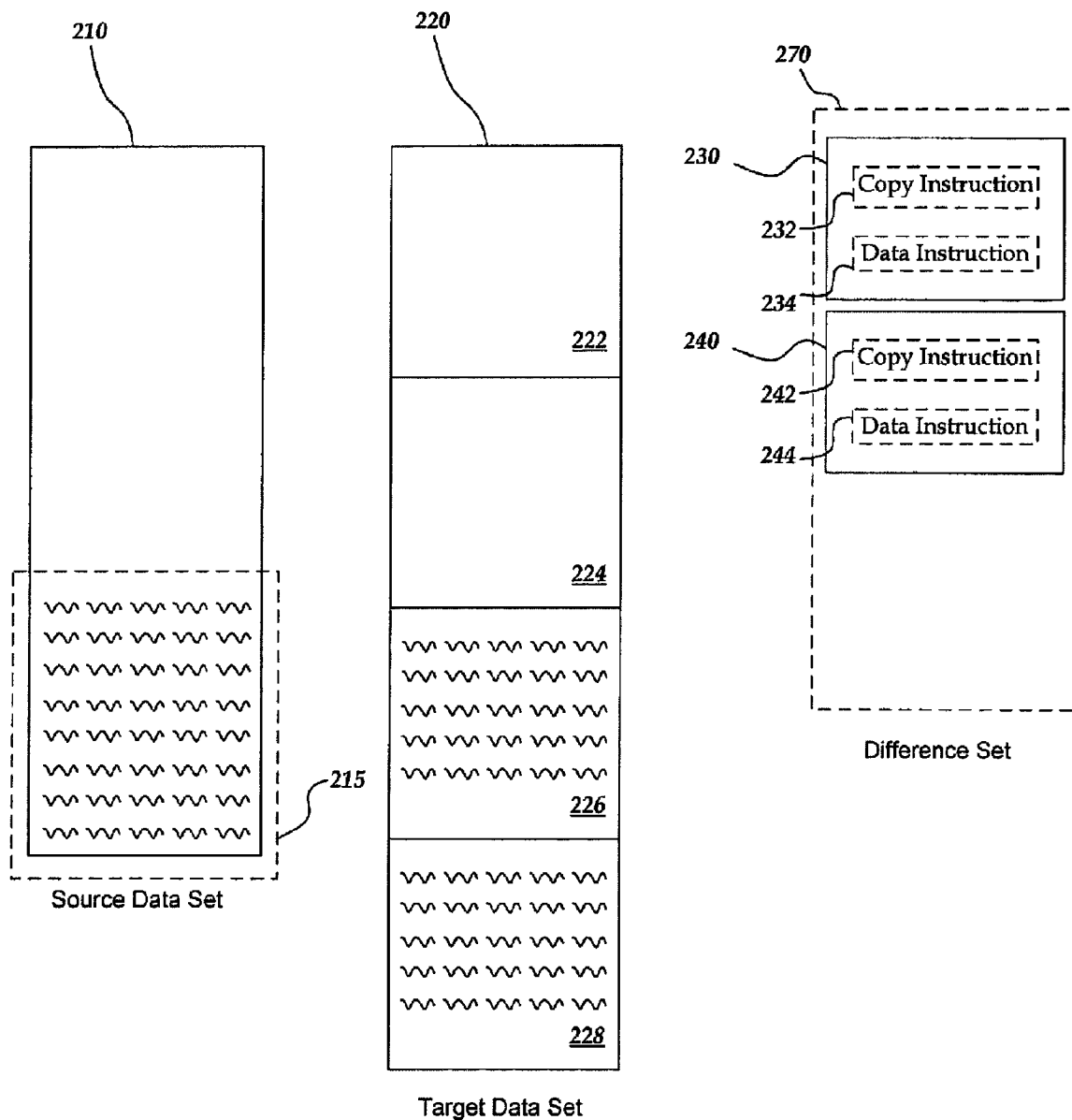

FIG. 2C shows the creation of a second difference portion 240 of the difference set 270 including instructions for copying, when possible, data from the source data set 210. Similar to the creation of the first difference portion 230 of the difference set 270, the creation of the second difference portion 240 of the difference set 270 begins with the execution of a page comparison of the second target block 224 to the source data set 210. In this case, such a comparison would also reveal that an unbroken copy of the complete target block 224 is not included within the source data set 210. The target block 224 is therefore a non-matching target block and a longest subsequence matching process is executed. In response to this process the second difference portion 240 of the difference set is created. The second difference portion 240 of the difference set 270 includes one or more copy instruction 242 to copy a string from the source data set 210 to the copy of the target data set 220 where data is common to both the source set 210 and the target block 224. The partial difference set 240 may also include data instructions 244 to add data not present in the source data set 210 to the copy of the target data set 220. Thus, the second difference portion 240 may provide instructions for the creation of a copy of the target block 224 by copying one or more strings from the source data set 210 and to add one or more new data strings not included in the source data set 210.

Figure 2D:
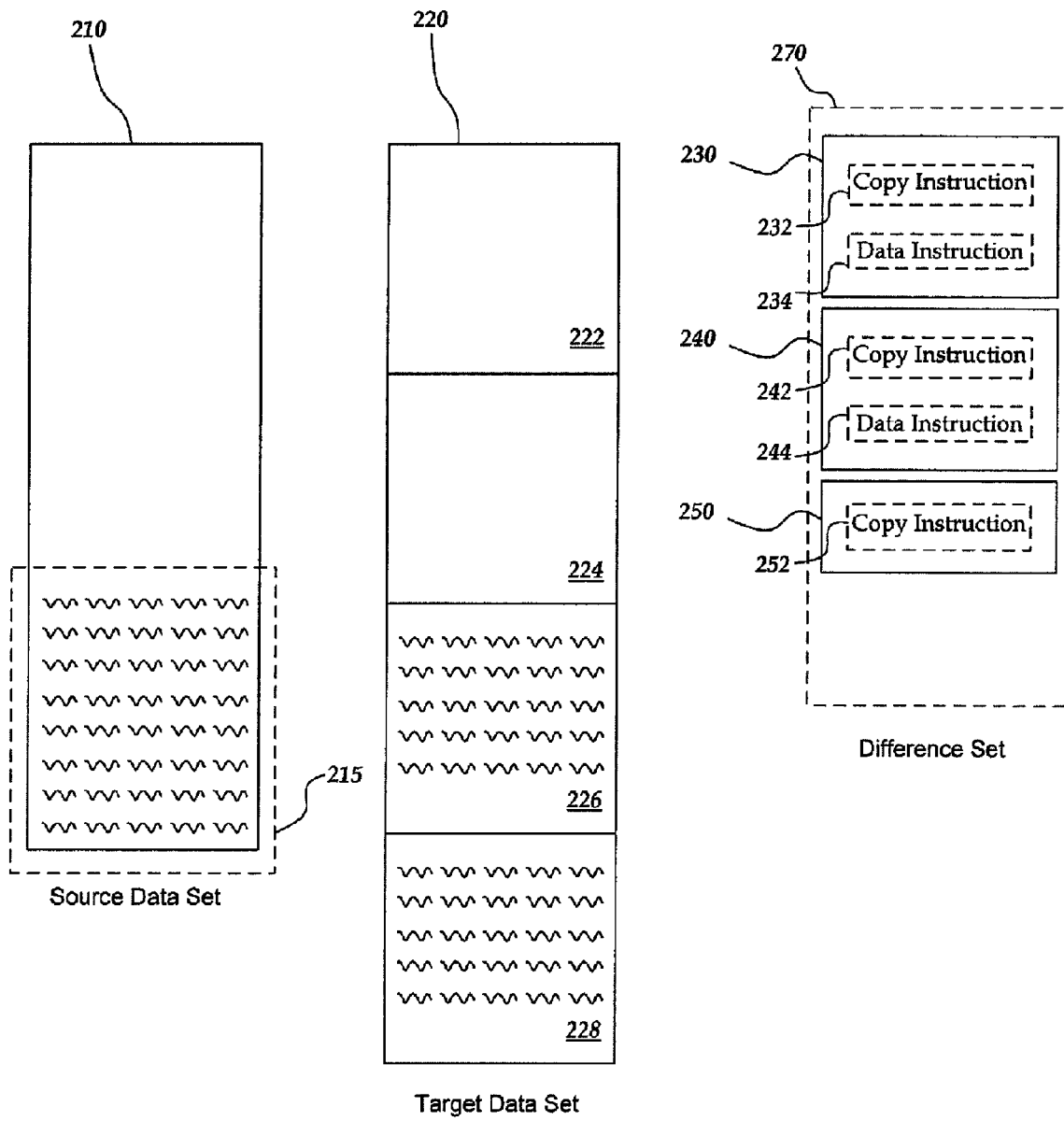

FIG. 2D shows the creation of a third difference portion 250 of the difference set 270 including instructions for creating a copy of the target block 226 from the source data set 210. The creation of the third difference portion 250 of the difference set 270 begins with the execution of a page comparison of the third target block 226 to the source data set 210. In this case, the comparison identifies that an unbroken copy of the complete target block 226 is included within the source data portion 215 of the source data set 210. In response to finding a match, a single instruction 252 is created in the fourth portion 250 of the difference set 270 to copy the matching block of data from the source data portion 215 of the source data set 210 to the copy of the target data set 220. Because the entire target block 226 may be created by a single copy instruction, no additional data instruction is needed.

Figure 2E:
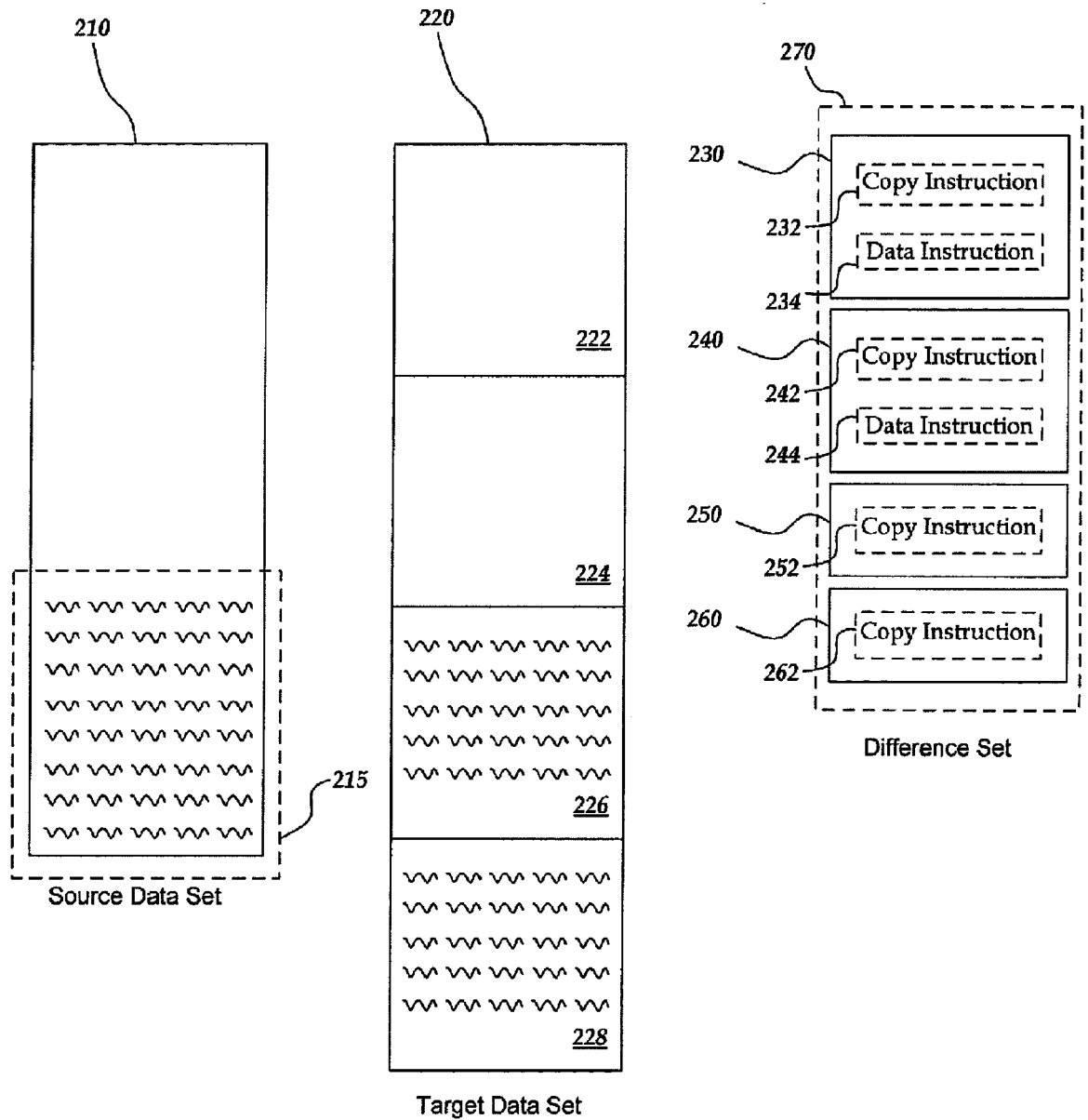

FIG. 2E shows the creation of a final difference portion 250 of the difference set 270 including instructions for creating a copy of the target block 226 from the source data set 210. The creation of the final difference portion 260 of the difference set 270 begins with the execution of a page comparison of the final target block 228 to the source data set 210. In this case, the comparison identifies that an unbroken copy of the target block 226 is included within the source data portion 215 of the source data set 210. As a result of this comparison, a single instruction 262 is created in the difference set 270 to copy the matching block of data from the source data portion 215 of the source data set 210 to the copy of the target data set 220. Because the entire target block 228 may be created by a single copy instruction, no additional data instruction is needed. Thus, together the portions 230-260 form the difference set 270 to provide instructions for the creation of a copy of the target data set 220 from the source data set 210.

Although the above implementation was described with reference to working with raw data, a similar process may be applied when working with hashes. The difference portions 230-260 may be created based on hash comparisons or raw data comparisons. For example, in a hash-based implementation the creation of the final difference portion 260 of the difference set begins with the execution of comparison of a hash of the target block 228, to a hash of the source data set 210. In this case, the comparison identifies that an unbroken copy of the complete hash of the target block 226 is included within a portion of the source hash that is associated with the source data portion 215. Because the hash of the target block 228 matches the portion of the source data hash associated with the source data portion 215, the target block 228 contains data that matches the source data portion 215. Thus, as a result of the hash comparisons, an instruction 262 is created in the final difference portion 260 of the difference set to copy the matching block of data from the source data portion 215 of the source data set 210 to the copy of the target data set 220. In this manner, a difference set may be created by hash comparisons as well as raw data comparisons.

Implementations of a Differencing System

Figure 3:
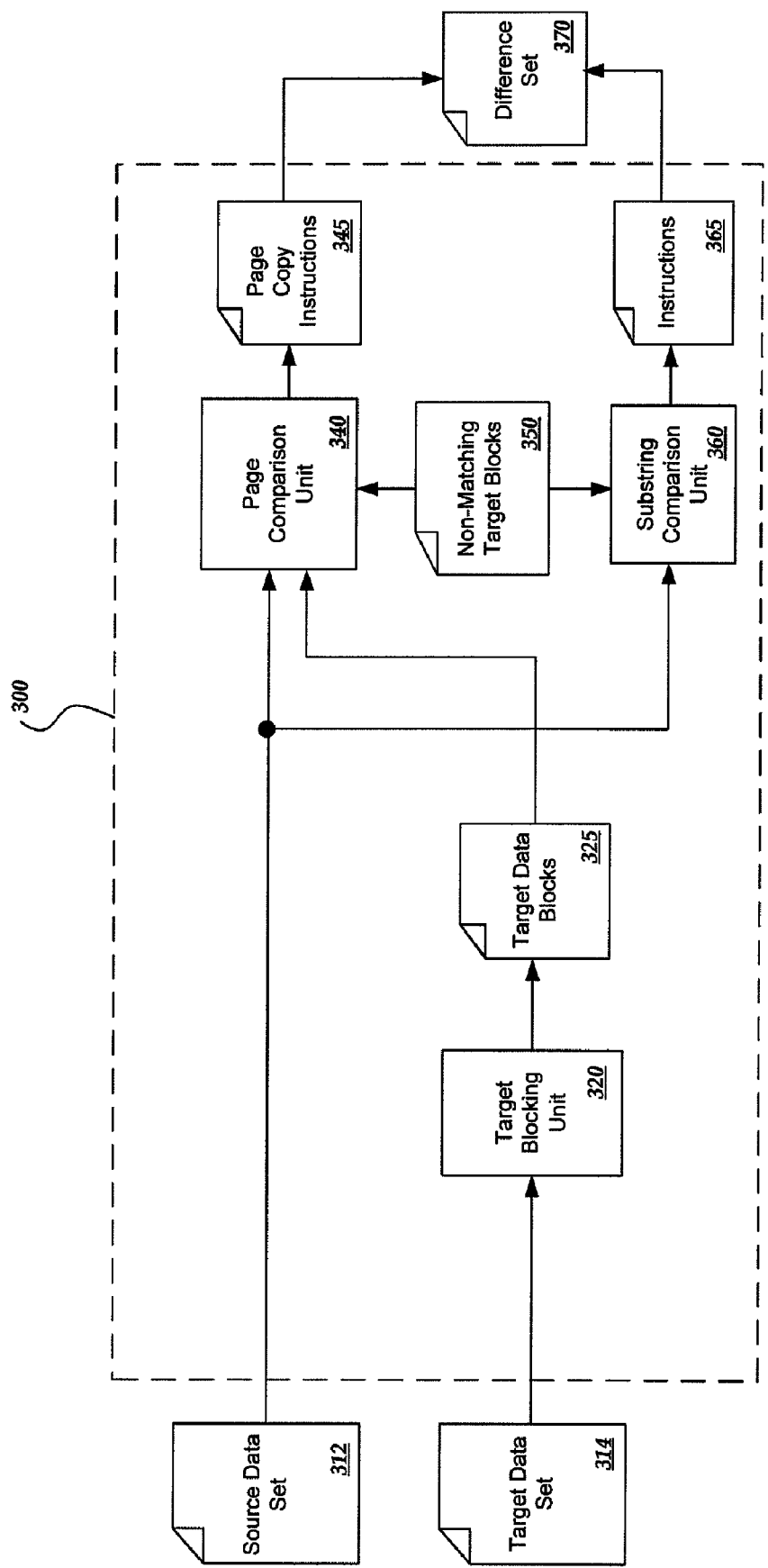
FIG. 3 is a block diagram illustrating an implementation of a system for creating a difference set.

FIG. 3 shows a block diagram of an implementation of a differencing system 300 to create a difference set 370. The differencing system 300 receives a source data set 312. The source data set 312 is transmitted to a page comparison unit 340 and a substring comparison unit 360. The differencing system 300 also receives a target data set 314. The target data set 314 is passed to a target blocking unit 320. The target blocking unit 320 divides the target data set 314 into a set of target data blocks 325. The target data set 314 may be divided into target data blocks of any size. In some implementations the target blocking unit 320 may divide the target data set 314 into blocks having a size similar to that of pages associated with the target data set 314. After the target data set 314 has been divided into target data blocks 325, the target data blocks 325 are transmitted to the page comparison unit 340.

The page comparison unit 340 identifies the individual target blocks 325 that do not match any portion of the source data set 312. This may be determined by searching the source data set 312 for an unbroken copy of the string of data of each of the individual target blocks 325. If an unbroken copy of a full target block is included within the source data set 312, a match is found. The page comparison unit then creates a set of page copy instructions 345 that correspond to each target block that matches a portion of the source data set 312. The page copy instructions 345 are instructions to copy a portion of the source data set 312 associated with the portion of the source data set 312 that matched the target data block. The copy instructions 345 are added into a difference set 370. If an unbroken copy of the full target block is not included within the source data set, no match is found. The page comparison unit 340 transmits a set of non-matching target block 350 to a substring comparison unit 360.

The substring comparison unit 360 receives the non-matching target blocks 350 and the source data set 312. The substring comparison unit 360 then identifies the sub-portions of each non-matching target block 350 that are included within the source data set 312, and the sub-portions of each non-matching target block 350 that are not included within the source data set 312, as described in more detail below with reference to FIG. 5A-5C. The string comparison unit creates a set of instructions 365 to copy matching strings and inserting new data as previously described. The set of instructions 365 are then added into the difference set 370.

Figure 4:
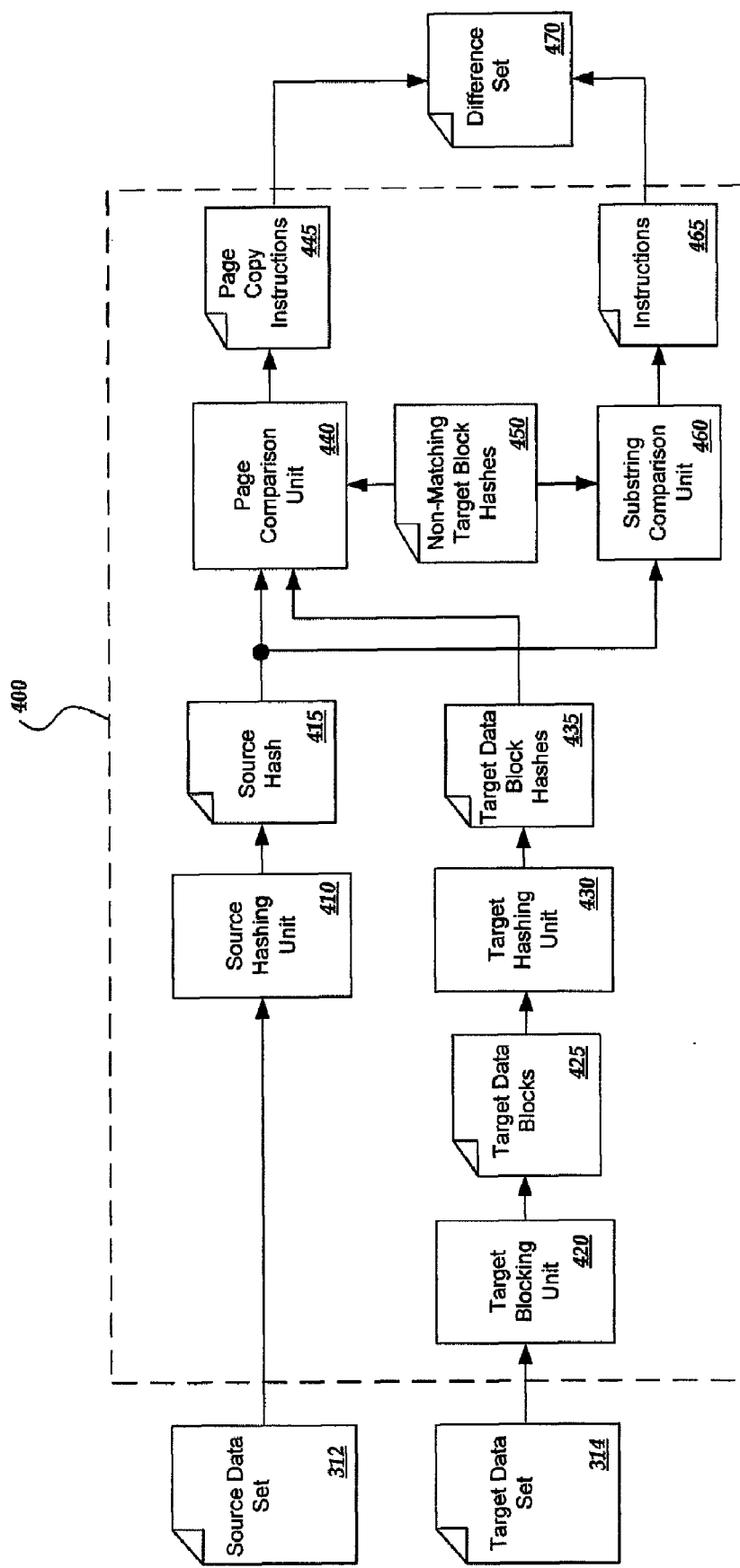
FIG. 4 is a block diagram illustrating an alternative implementation of a system for creating a difference set.

FIG. 4 shows a block diagram of an alternative implementation of a differencing system 400 to create a difference set 470. The differencing system 400 works similarly to the differencing system 300 of FIG. 3, but hashes are used. The differencing system 400 receives a copy of the source data set 312. The source data set 312 is transmitted to a source hashing unit 410. The source hashing unit 410 creates a source hash 415 of the source data set 312. The source hashing unit 415 may use any standard hashing process, such as an exclusive or (XOR) function. The source hash 415 is transmitted to a page comparison unit 440 and a substring comparison unit 460.

The differencing system 400 also receives the target data set 314. The target data set 314 is passed to a target blocking unit 420. The target blocking unit 420 divides the target data set 314 into a set of target data blocks 425. The target data set 314 may be divided into target data blocks of any size. In some implementations the target blocking unit 420 may divide the target data set 314 into blocks having a size similar to that of pages associated with the target data set 314. After the target data set 314 has been divided into target data blocks 425, the target data blocks 425 are transmitted to a target hashing unit 430. The target hashing unit 430 hashes each of the target data blocks 425 to create a set of target data block hashes 435. The target hashing unit 430 may use any standard hashing process, such as an XOR function. In some implementations, the target hashing unit 430 may use the same hashing process as the source hashing unit 410 to facilitate comparisons between the hashes. Once the target data blocks 425 have been hashed by the target hashing unit 430, the target data block hashes 435 are transmitted to the page comparison unit 440.

The page comparison unit 440 identifies the individual target block hashes 425 that do not match any portion of the source hash 415. This may be determined by searching the source hash 415 for an unbroken copy of the string of hash data of each of the individual target block hashes 425. If an unbroken copy of a full target block hash is included within the source hash 415, a match is found. The page comparison unit then creates a set of page copy instructions 445 that correspond to each target hash block that matches a portion of the source hash 415. The page copy instructions 445 are instructions to copy a portion of the source data set 312 associated with the portion of the source data hash 415 that matched the target data block hash. The copy instructions 445 are added into a difference set 470. If an unbroken copy of the full target block hash is not included within the source hash 415, no match is found. The page comparison unit 440 transmits a set of non-matching target block hashes 450 to a substring comparison unit 460.

The resulting page copy instructions 445 may be similar to the page copy instructions 345 of the differencing system 300. In rare instances, the target data block hashes may match the source hash, while the underlying target data block does not match the source data. Other than in these rare errors cases, the page copy instructions 445 would be identical to the page copy instructions 345. Thus, the generation of page copy instructions may not depend on whether hashes or raw data are used for the page comparison.

The substring comparison unit 460 receives the non-matching target hashes 450 and the source hash 415. The substring comparison unit 460 then identifies the sub-portions of each non-matching target block hash 450 that are included within the source hash 415, and the sub-portions of each non-matching target block hash 450 that are not included within the source hash 415, as described in more detail below with reference to FIGS. 5A-5C. The string comparison unit creates a set of instructions 465 to copy matching strings and inserting new data as previously described. The set of instructions 465 are then added into the difference set 470.

The resulting instructions 465 are similar to the instructions 365 of the differencing system 300. That is, except in the rare error case where sub-portions of the target data block hashes match the source hash but the underlying target data does not match the source data, the page copy instructions 445 would be identical to the page copy instructions 345. Thus, the instructions 445 may not depend on the method of string comparison made. Therefore, the final difference set 470 may be identical to the difference set 370.

Longest Subsequence Matching Process

Figure 5A:
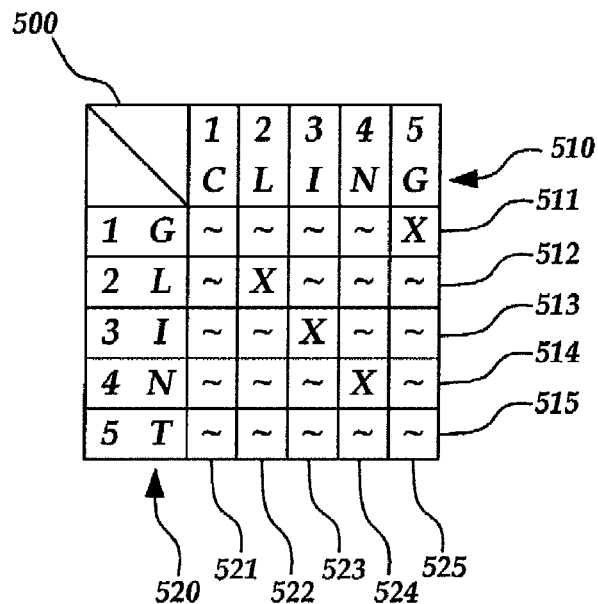
FIGS. 5A-5C are diagrams illustrating an implementation of the creation of a difference set.
Figure 5B:
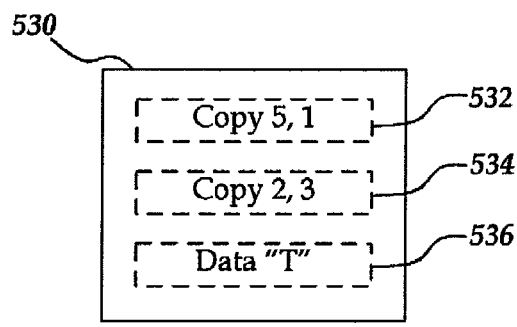
Figure 5C:
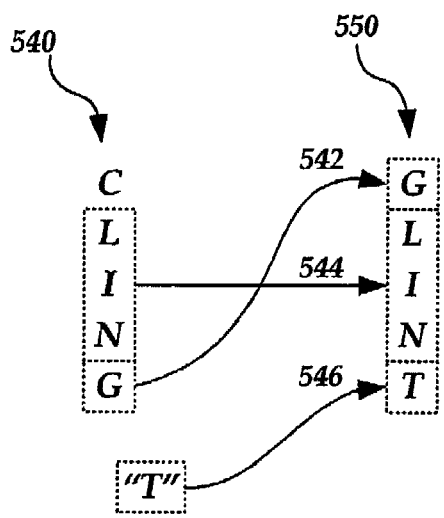

FIGS. 5A-5C show an implementation of a process for locating the longest matching subsequences between two sets of data. An implementation of this process may be executed by the substring comparison unit 360 of FIG. 3 or the substring comparison unit 460 of FIG. 4.

FIG. 5A shows a table 500 in which a source data set 510 and a target data set 520 have been inserted. The source data set 510 includes the string "CLING" and is displayed above columns 521-525. Each column is associated with a character of the source data set 510. For example, column 521 is associated with the "C" of "CLING" in the source data set 510. The target data set 520 includes the string "GLINT" and is displayed to the left of rows 511-515. Each row is associated with a character of the target data set 520. For example, row 511 is associated with the "G" of "GLINT" in the target data set 520.

To illustrate a process to locate the longest subsequences that the source data set 510 and the target data set 520 have in common, an "X" is shown in each cell where an individual character is held in common. For example, the column 521 contains five cells that are each associated with the "C" of "CLING." Each of these cells also corresponds to a particular character associated with the row within which they are included. For example, the first cell of column 521 is also the first cell of row 511. Thus, the first cell of column 521 is associated with both the "C" of "CLING" and the "G" of "GLINT," and thus a match is not present. Similarly, the second cell of the column 521 is also the first cell of the row 512. Thus, the second cell of the column 521 is associated with both the "C" of "CLING" and the "L" of "GLINT," and thus a match is not present. Each other cell of the column 521 is associated with a character that does not match "C," and thus no "X" marks are present in column 521.

Similarly, the column 522 is associated with the "L" of "CLING." Thus, the column 522 contains five cells that are each associated with "L." In this case, row 512 is also associated with an "L." Thus, an "X" is shown in the cell associated with column 522 and row 512 to indicate a common character. This process is then repeated for each column, resulting in an "X" shown at each location where the character associated with a column is common to a character associated with a row intersecting that column.

After the "X" marks are shown, the consecutive "X" marks are grouped together as a matching subsequence. For example, an "X" mark associated with the "G" of "CLING" is found at the column 525 and the row 511. There are no "X" marks present either directly before or directly after it. Because there are no consecutive matching characters, it is grouped into a subsequence of only one character. On the other hand, the "X" mark associated with the "L" of "CLING" is consecutively next to two additional "X" marks: the "X" marks of the "I" and the "N" of "CLING." These three "X" marks are located in consecutive columns of the source data set 510. Further, these three "X" marks are also located in consecutive rows of the target data set 520. Thus, because these three "X" marks are consecutive in both the source data set 510 and the target data set 520, they are identified as a matching subsequence and the characters associated with the "X" marks are grouped together. This process is repeated to identify all of the longest matching subsequences.

Although the implementation of a longest matching subsequence process described above searches each row for a character that matches a selected column, in other implementations the process may be reversed. For example, a row may be selected and each column may be searched for a match. This process would result in the same set of "X" marks and thus would identify the same set of longest matching subsequences.

FIG. 5B shows a portion of a difference set 530 that includes instructions created to describe the modifications that may be applied to the source data set 510 "CLING" to create a copy of the target data 520 "GLINT" based on the longest matching subsequences identified in table 500. The difference set 530 begins with an instruction 532 associated with the subsequence containing the first character of the target data set 520, "G." As discussed above with reference to FIG. 5A, the longest subsequence containing "G" was the single-character subsequence "G." To replicate the "G" of the source data set 510 in a copy of the target data set 520, a copy instruction 532 is inserted into the difference set 530. The copy instruction 532 defines the column from where the data is to be copied, and the length of the string that is to be copied. In this case, only one character, "G," is to be copied from the fifth column. Thus, the copy instruction 532 reads "Copy 5, 1." The difference set 530 continues with an instruction 534 associated with the subsequence containing the second character of the target data, "L." As discussed above with reference to FIG. 5A, "L" is incorporated as part of a subsequence of three characters, "LIN," that begins at the second column of the source data set 510. Thus, the instruction 534 is a copy instruction that reads "Copy 3, 4."

In combination, the first two instructions 532 and 534 define the first four characters of the target data set 520. The final character of the target data set 520, "T," is not included within the source data set 510. Thus, a copy instruction may not be used. In order to generate the final character of the target data set 520, a data instruction 536 is included within the difference set 530. The data that is to be inserted is included within the data instruction. The data instruction 536 is a command to insert a piece of data in the target data set copy 550. Thus, this data instruction 536 reads "Data 'T'" to instruct that a "T" be inserted into the target data set copy 550.

FIG. 5C shows a graphical representation 540 of the execution of the instructions of the difference set 530 of FIG. 5B. A first transformation 542 represents the execution of the first copy instruction 532 of FIG. 5B. There, a string of one character that begins at the fifth character of the source data set 510 is copied to the beginning of a target data set copy 550. That is, the "G" of "CLING" is copied from the source data set 510 to the target data set copy 550 to form the "G" of "GLINT." Because this was the first transformation executed, the information was copied to the beginning of the target data set copy 550. A second transformation 544 represents the execution of the second copy instruction 534 of FIG. 5B. There, a string of three characters that begins at the second character of the source data set 510 is copied to the next position of the target data set copy 550. That is, the "LIN" of "CLING" is copied from the source data 510 to the target data set copy 550 to form the "LIN" of "GLINT."Because one character is already placed in target data set copy 550, "G." "LIN" is copied to a location beginning at the second character of the target data set copy 550. A third transformation 546 represents the execution of the data instruction 536 of FIG. 5B. There, a string of one character, "T," is inserted into the target data set copy 550. Because four characters are already included within the target data set copy 550, the "T" is inserted into a location beginning at the fifth character of the target data set copy 550. Thus, through the execution of the three transformations 542, 544, and 546, the target data set copy 550 is created from the source data 510.

Although FIGS. 5A-5C describe a longest subsequence matching process that is executed on the raw source data 510 and the raw target data 520 to create the difference set 530, any form of data may be used. For example, the source data 510 and the target data 520 may first be hashed and a hash table created. The similarities and differences between the source data 510 and the target data 520 may be determine with reference to the similarities and differences between hashes. Similarly, any process may be used to identify the similarities and differences between the source data 510 and the target data 520 in order to create the difference set 530. Further, any format of instructions may be used. For example, rather than building the copy of the target data set 550 from beginning to end, the individual instruction may define the position within the copy of the target data set 550 the corresponding data is to be placed.

Process for Creating a Difference Set

Figure 6:
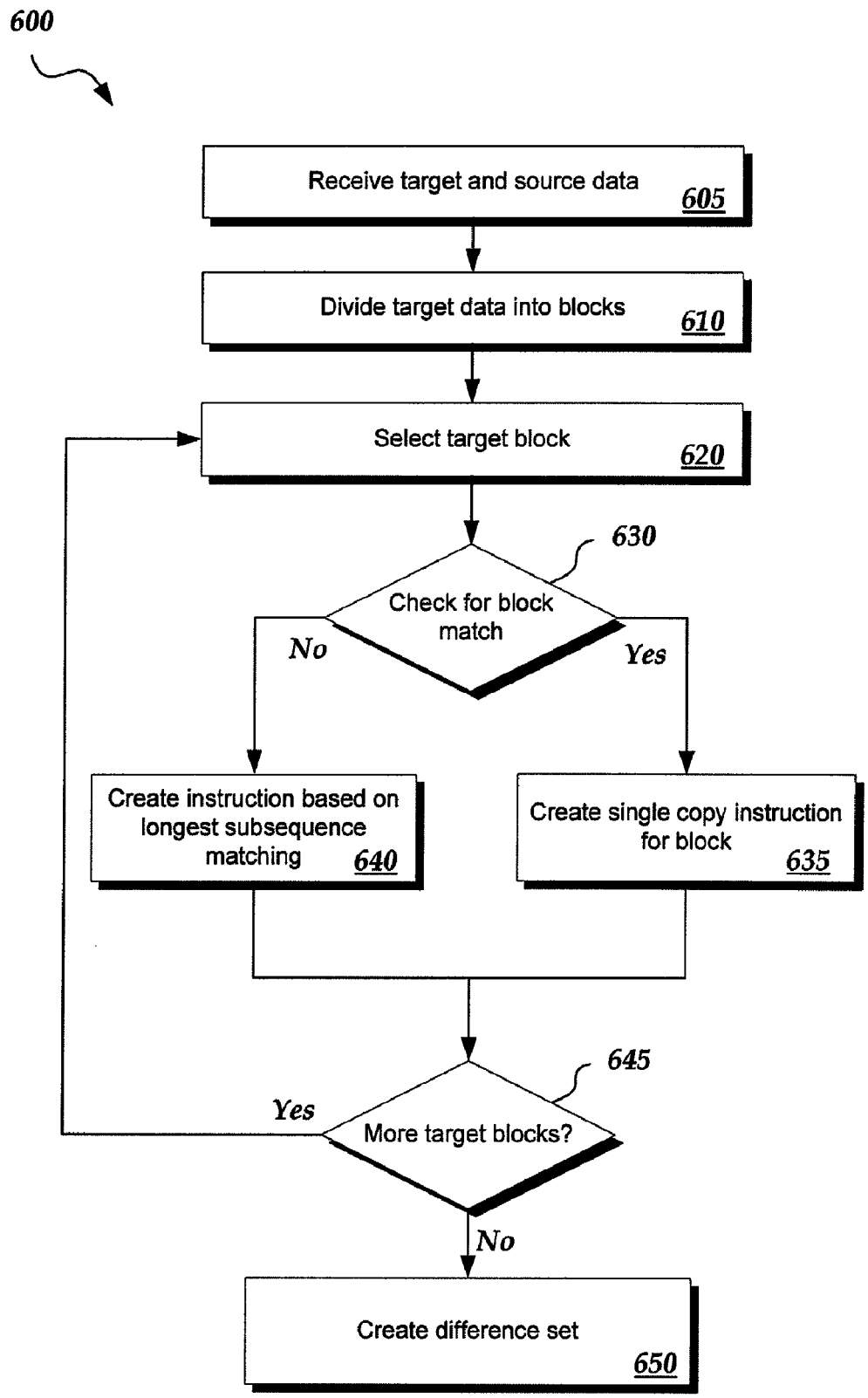
FIGS. 6 and 7 are flow diagrams illustrating implementations of a process for creating a difference set.

FIG. 6 shows a flow diagram representing an implementation of a raw data based process 600 for creating a difference set. At 605, the diagram of the process 600 begins when the target data and source data are received. At 610, the target data is divided into blocks. The size of the blocks may, for example, be equal to a page size associated with the target data. At 620, a first target block is selected from among the target blocks. At 630, a determination is made as to whether the selected target block matches any portion of the source data set. This may be determined by searching the source data for an unbroken copy of the selected target block. If an unbroken copy of the selected target block is located within the source data set, a match is found. If an unbroken copy of the selected target block is not located within the source data set, no match is found. If a match is found, the diagram of the process 600 continues to 635. At 635, a copy instruction is created to copy a portion of the source data associated with the portion of the source data set that matches the selected target data block. If a match is not found, the diagram of the process 600 continues to 640.

At 640, a longest subsequence matching process is executed. This process identifies both the sub-portions of each non-matching target block that are included within a portion of the source data set, and the sub-portions of each non-matching target block that are not included within the source data set. Based on the results of the longest subsequence matching process, a set of instructions is created that describe the building of a copy of the sub-portions of the target data associated with the non-matching target blocks from the source data set. As described in more detail above with reference to FIGS. 2A-2E, the instructions may include both data and copy instructions.

At 645, a determination is made whether another target data block needs to be evaluated. When not all of the target data blocks have been evaluated, the diagram of the process 600 returns to 625 and the next target block is selected. When all of the target data blocks have been evaluated, and no further target data block remain, the diagram of the process 600 continues to 650. At 650, all of the instructions are combined to create the difference set and the diagram of the process 600 ends.

Figure 7:
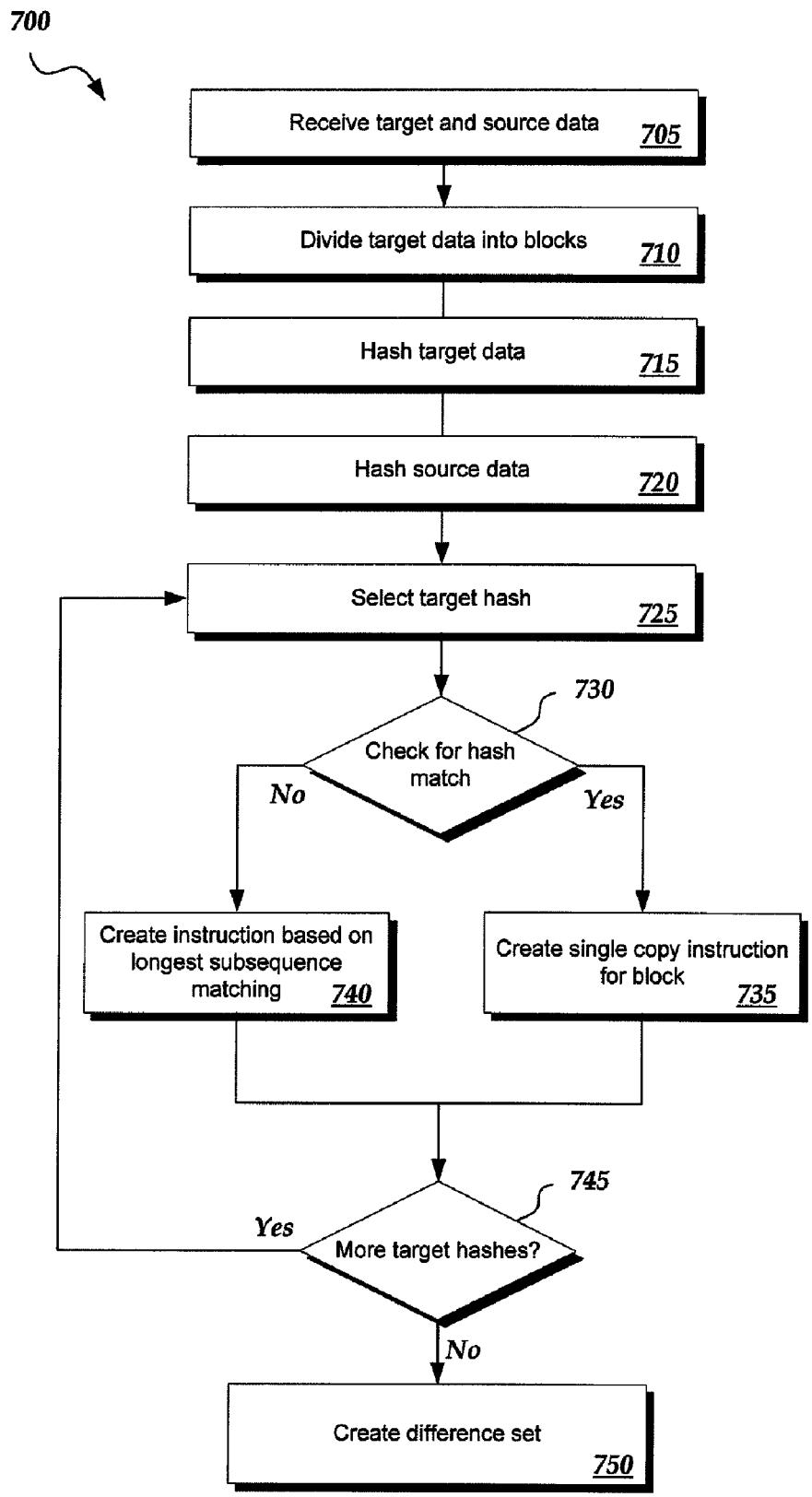

FIG. 7 shows a flow diagram representing an implementation of a hash-based process 700 for creating a difference set. At 705, the diagram of the process 700 begins when the target data and source data are received. At 710, the target data is divided into blocks. The size of the blocks may, for example, be equal to a page size associated with the target data. At 715, a hash of each of the target data blocks is created. Any standard hashing process, such as an XOR function, may be used to create the target data block hashes. At 720, a hash of the source data may be created. Any standard hashing process, such as an XOR function, may be used to create the source hash. To facilitate comparisons between the hashes, in some implementations, the hashing process used to create the hash of the source data may be the same process used to create each of the target data hashes.

At 725, a target hash is selected from among the target hashes. At 730, a determination is made as to whether the selected target hash matches any portion of the source data hash. This may be determined by searching the source hash for an unbroken copy of the selected target hash. If an unbroken copy of the selected target hash is located within the source hash, a match is found. If an unbroken copy of the selected target hash is not located within the source hash, no match is found. If a match is found, the diagram of the process 700 continues to 735. At 735, a copy instruction is created to copy a portion of the source data associated with the portion of the source data hash that matches the selected target data hash. If a match is not found, the diagram of the process 700 continues to 740.

At 740, a longest subsequence matching process is executed. This process identifies both the sub-portions of each non-matching target hash that are included within a portion of the source hash, and the sub-portions of each non-matching target hash that are not included within the source hash. Based on the results of the longest subsequence matching process, a set of instructions is created that describe the building of a copy of the sub-portions of the target data associated with the non-matching target hash from the source data set. As described in more detail above with reference to FIGS. 2A-2E, the instructions may include both data and copy instructions.

At 745, a determination is made whether another target data hash needs to be evaluated. When not all of the target data hashes have been evaluated, the diagram of the process 700 returns to 725 and the next target hash is selected. When all of the target data hashes have been evaluated, and no further target data block hashes remain, the diagram of the process 700 continues to 750. At 750, all of the instructions are combined to create the difference set and the diagram of the process 700 ends.

Creation and Transmission of a Difference Set

Figure 8:
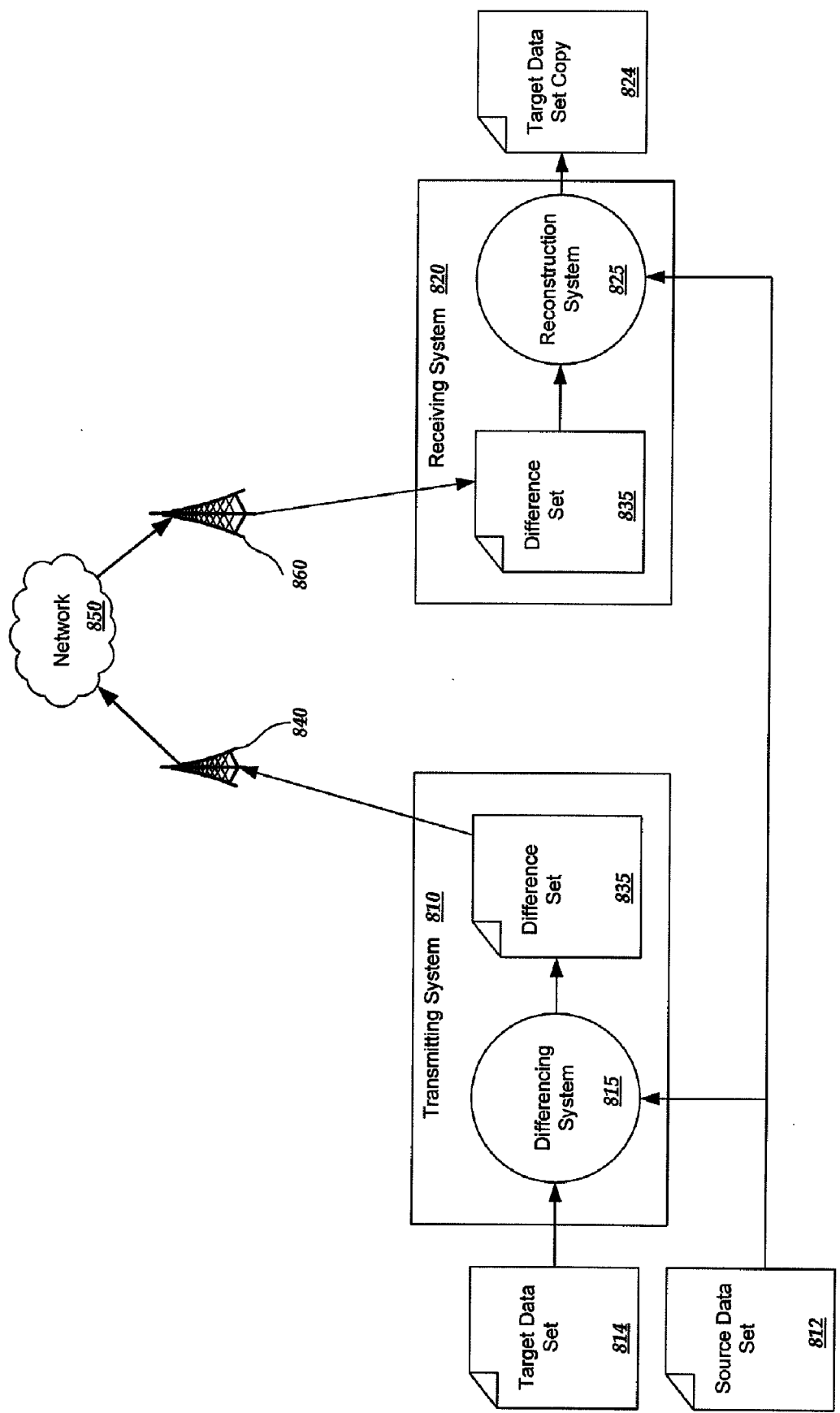
FIG. 8 is a diagram illustrating an implementation of a system for communicating a difference set between two computing devices.

FIG. 8 shows an implementation of a system for transmitting a difference set of data 835 between a transmitting system 810 and a receiving system 820. The difference set 835 is a set of data that reflects differences between a source data set 812 and a target data set 814. The difference set 835 is created by a differencing system 815 on the transmitting system 810. The differencing system 815 receives as input the source data set 812 and the target data set 814. The differencing system 815 identifies the differences and similarities between the source data set 812 and the target data set 814. Where similarities are found, the differencing system inserts into the difference set 835 instructions to copy the similar information from the source data set to the target data set copy 824. Where differences are found and data in the target set 814 is not found in the source data set 812, the differencing system 815 inserts into the difference set 835 instructions to insert the needed data into the target data set copy 824. Thus, based on the identified similarities and differences between the source data set 812 and the target data set 814, the differencing system 815 creates a difference set 835 that includes instructions for creating the target data set copy 824 from the source data set 812.

Once the difference set 835 is created at the transmitting system 810, it may be transmitted to the receiving system 820. Although the transmitting system 810 receives a copy both of the source data set 812 and the target data set 814, the receiving system 820 receives a copy of the source data set 812 but not the target data set 814. For example, when a hardware system, such as a cellular phone, is manufactured, a transmitting system may be located at the manufacturing facility and may upload an operating system to the cellular phone. After manufacture, the cellular phone is sold to a user and is no longer located at the manufacturing facility. When the manufacturer creates an updated operating system, the transmitting system has direct access to it, but the cellular phone does not. Thus, the transmitting system has direct access to the old operating system and the new operating system, while the cellular phone has direct access only to the old operating system. To update the cellular phone, a copy of the new operating system is needed on the cellular phone. In many cases, only minor modifications to the operating system may be present between the old and the new operating system, and therefore, a difference set that is created may be small. Thus, the cost of updating the operating system may be reduced by transmitting only a difference set, rather than a full copy of the new operating system.

To transmit the difference data set 835 from the transmitting system 810 to the receiving system 820, the difference data set 835 is first transmitted into a network 850 by an antenna 840 that is coupled to the transmitting system 810. The difference set 835 is then received from the network 850 at an antenna 860. From the antenna 860, the difference set 835 is then transferred to the receiving system 820. After receiving the difference set 835, the receiving system 820 has as input both the difference set 835 and the source data set 812. A reconstruction system 825 then executes the instruction of the difference set 835 to create the target data set copy 824 from the source data set 812. Thus, a local copy of the target data set 814 is obtained at the receiving system 820 without the need to directly transmit the target data set 814. Although the system 800 is described with reference to wireless transmission, the same process applies equally to any form of transmission. For example, savings may also be realized when updates are transferred over a wired network, or even when transferred on physical storage media, such as a compact disc or any other storage media known to those of ordinary skill in the art. By transferring the difference set, bandwidth and/or the number of compact disc needed may be reduced.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A computer-implemented method comprising:
    receiving a source data set and a target data set; and
    identifying differences between the target data set and the source data set, including:
        dividing the target data set into a set of target data blocks;
        identifying among the target data blocks at least one duplicate block that is identical to a first portion of the source data set;
        identifying at least one modified block among the target data blocks for which contents of the modified block are not duplicated within the source data set;
        identifying different portions and identical portions between the modified block and the source data set; and
        for the different portions performing a matching process and not performing the matching process on the identical portions.

2. The computer-implemented method of claim 1, further comprising in the identifying among the target data blocks at least one duplicate block:
    generating target data block hashes of each of the target data blocks;
    generating a source hash of the source data set; and
    identifying among the target data block hashes at least one duplicate hash that is identical to a first portion of the source data hash.

3. The computer-implemented method of claim 2, further comprising in the identifying at least one modified block:
    generating target data block hashes of each of the target data blocks;
    generating a source hash of the source data set; and
    identifying at least one modified block hash among the target data block hashes for which contents of the modified block hash are not duplicated within the source data hash.

4. The computer-implemented method of claim 1, wherein a size associated with the target data blocks is equal to a page size associated with the target data set.

5. The computer-implemented method of claim 1, wherein the matching process is a longest subsequence matching process.

6. The computer-implemented method of claim 1, further comprising generating a difference set by representing:
    contents of the duplicate block by an instruction to copy the first portion of the source data set to a first destination in a target data set; and
    contents of the modified block by an instruction to apply the differences between the source data set and the modified block to a second destination in the target data set.

7. The computer-implemented method of claim 1, further comprising generating a difference set by representing:
    contents of the duplicate block by an instruction to copy the first portion of the source data set to a first destination in a target data set;
    contents of the modified block by an instruction to include the different portions of the modified block at a second destination in the target data set; and
    contents of the modified block by an instruction to copy the identical portions of the modified block to a third destination in the target data set.

8. The computer-implemented method of claim 1, wherein:
    the source dataset includes a version of software; and
    the target data set includes an updated version of the software.

9. The computer-implemented method of claim 8, further comprising transmitting the difference set over a wireless network.

10. A computer-implemented method of generating a difference set, comprising:
    receiving a target data set;
    dividing the target data set into a plurality of target data blocks;
    receiving a source data set;
    identifying among the target data blocks duplicate blocks in which an unbroken copy of each duplicate block is located within the source data set;
    inserting within the difference set an instruction to copy a portion of the source data set that includes the unbroken copy of the duplicate block;
    identifying among the target data blocks modified blocks in which an unbroken copy of each modified block is not located within the source data set;
    determining differences and similarities between the modified blocks and the source data set; and
    inserting within the difference set instructions describing the differences and similarities between the modified blocks and the source data set, wherein a matching process is performed on a subset of the blocks.

11. The computer-implemented method of claim 10, wherein the identifying among the target data blocks duplicate blocks further includes:
    generating target data block hashes of each of the target data blocks;
    generating a source hash of the source data set; and
    identifying among the target data blocks hashes, duplicate block hashes in which an unbroken copy of each duplicate block hash is located within the source data hash.

12. The computer-implemented method of claim 10, wherein a size associated with the target data blocks is equal to a page size associated with the target data set.

13. The computer-implemented method of claim 10, wherein the matching process is a longest subsequence matching process.

14. The computer-implemented method of claim 10, wherein the determining differences and similarities between the modified blocks and the source data set further includes for the at least one modified block, determining a similarity between a sub-portion of content of the modified block and the source data.

15. The computer-implemented method of claim 14, further comprising inserting into the difference set an instruction that represents content of the at least one modified block by an instruction to copy the similarity between the at least one modified block and the source.

16. The computer-implemented method of claim 10, further comprising transmitting the difference set over a network.

17. A computer readable storage medium storing instructions to perform actions, comprising:
   receive a source data set and a target data set;
   divide the target data set into a set of target data blocks;
   identify among the target data blocks duplicate blocks in which unbroken copies of the duplicate blocks are located within the source data set;
   identify among the target data blocks non-duplicate blocks in which unbroken copies of the non-duplicate blocks are not located within the source data set and performing a matching process on these blocks; and
   identify among the non-duplicate blocks duplicate portions in which unbroken copies of the duplicate portions are located within the source data set.

18. The computer readable storage medium of claim 17, further comprising in the identifying among the target data blocks at least duplicate blocks:
   generate target data block hashes of each of the target data blocks;
   generate a source hash of the source data set; and
   identify among the target data block hashes duplicate block hashes in which an unbroken copies of the duplicate block hashes are located within the source data hash.

19. The computer readable storage medium of claim 18, wherein the determining differences between the modified block and the source data set further includes:
   identify among the target data block hashes at least one modified hash in which the complete content of the modified hash is not included within the source data hash as a single string of data;
   identify a similarity between a second portion of the source data hash and a first portion of the modified hash; and
   identify a difference between the source data hash and a second portion of the modified hash.

20. The computer readable storage medium of claim 18, further comprising instructions to:
   insert within a difference set instructions to copy portions of the source data set that include the duplicate blocks; and
   insert within the difference set instructions to copy portions of the source data set that include the duplicate portions.

* * * * *